US012771177B2

(12) United States Patent
He et al.

(10) Patent No.: US 12,771,177 B2
(45) Date of Patent: Oct. 20, 2026

(54) INJECTION DEVICE, AN EXTRACTION DEVICE, AND A SURFACE WAVE SYSTEM FOR POWER TRANSFER

(71) Applicant: Telefonaktiebolaget LM Ericsson (publ), Stockholm (SE)

(72) Inventors: Shousheng He, Södra Sandby (SE); Ashkan Kalantari, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 30 days.

(21) Appl. No.: 18/571,807

(22) PCT Filed: Jul. 1, 2021

(86) PCT No.: PCT/EP2021/068197

§ 371 (c)(1),
(2) Date: Dec. 19, 2023

(87) PCT Pub. No.: WO2023/274539

PCT Pub. Date: Jan. 5, 2023

(65) Prior Publication Data

US 2024/0283298 A1 Aug. 22, 2024

(51) Int. Cl.
*H02J 50/20* (2016.01)
*H02J 50/00* (2016.01)

(52) U.S. Cl.
CPC ............ *H02J 50/20* (2016.02); *H02J 50/005* (2020.01)

(58) Field of Classification Search
CPC ................................ H02J 50/20; H02J 50/005
See application file for complete search history.

(56) References Cited

U.S. PATENT DOCUMENTS

| | | | | |
|---|---|---|---|---|
| 7,518,952 | B1 | 4/2009 | Padden | |
| 9,099,885 | B2 | 8/2015 | Kamata | |
| 9,979,234 | B2 | 5/2018 | Yu et al. | |
| 10,173,538 | B2 | 1/2019 | Iwawaki et al. | |
| 10,277,061 | B1 * | 4/2019 | Kerselaers | H02J 50/80 |
| 2009/0072629 | A1 | 3/2009 | Cook et al. | |
| 2016/0112092 | A1 | 4/2016 | Henry et al. | |
| 2018/0166920 | A1 | 6/2018 | Britz et al. | |

(Continued)

FOREIGN PATENT DOCUMENTS

WO 9857413 A1 12/1998

OTHER PUBLICATIONS

Barlow, et al., "Surface Waves," IEEE Radio Section, Paper No. 1482, Apr. 22, 1953, pp. 329-341.

(Continued)

*Primary Examiner* — Daniel Cavallari
(74) *Attorney, Agent, or Firm* — Withrow & Terranova, PLLC

(57) ABSTRACT

The present invention relates to an injection device for wireless power transfer comprising an RF signal generator configured to generate a Radio Frequency (RF) signal of a predetermined frequency; an injection probe connected to the RF signal generator, wherein the injection probe is configured to be coupled to an electrical cable comprising at least one conductor; wherein the injection probe comprises circuitry for injecting the RF signal as a surface electromagnetic wave into said electrical cable. The invention also relates to a system for wireless power transfer.

3 Claims, 2 Drawing Sheets

(56) References Cited

U.S. PATENT DOCUMENTS

| | | | | |
|---|---|---|---|---|
| 2019/0154734 | A1 | 5/2019 | Chu et al. | |
| 2023/0020865 | A1 * | 1/2023 | Gundel | G01R 31/083 |

OTHER PUBLICATIONS

Dengler, "Self inductance of a wire loop as a curve integral," Advanced Electromagnetics, vol. 5, Issue 1, Jan. 2016, 8 pages.

International Search Report and Written Opinion for International Patent Application No. PCT/EP2021/068197, mailed Mar. 11, 2022, 11 pages.

* cited by examiner

INJECTION DEVICE, AN EXTRACTION DEVICE, AND A SURFACE WAVE SYSTEM FOR POWER TRANSFER

This application is a 35 U.S.C. § 371 national phase filing of International Application No. PCT/EP2021/068197, filed Jul. 1, 2021, the disclosure of which is incorporated herein by reference in its entirety.

TECHNICAL FIELD

The present disclosure relates to the field of power transfer. More particular, the invention relates to an extraction device and an injection device as well as a system for power transfer by means of surface waves.

BACKGROUND

In modern wireless communication efficient wireless power supply for communication devices is of great interest. In the art of wireless charging and wireless power supply different solutions are available, such as Qi charging for wireless power transfer. These solutions utilize inductive coupling between a first coil in the power supply and a second coil in the device which requires a power supply. For the charging method to work, the first coil and the second coil are placed in close proximity to each other, which can be defined as typically from zero up to a couple of centimeters, the maximum being four centimeters. This requirement of close proximity between the coils makes inductive coupling problematic for a large number of different low-power devices, such as for example fire-alarm sensors, motion/audio detectors, beacons i.e. a low power device that broadcast its identity and/or location, radio dots or wearable sensor devices in for example a Wireless Body Area Network.

Other solutions based on for example cross resonance between coils have also been suggested as viable solutions for wireless power transfer or WPT. The disadvantage of existing solutions is the need for a large primary coil that is connected to a power supply.

Thus, there is a need for an improved power transfer system that is able to mitigate, alleviate, or eliminate the need for coil-to-coil-coupling and their close proximity requirement.

SUMMARY

An object of the present disclosure is to provide a power transfer system which seeks to mitigate, alleviate, or eliminate one or more of the above-identified deficiencies in the art and disadvantages singly or in any combination and to provide an improved power transfer system.

This object is obtained by an injection device for power transfer, comprising an RF (radio frequency) signal generator configured to generate an RF signal with a predetermined frequency, an injection probe connected to the RF signal generator, wherein the injection probe is configured to be coupled to an electrical cable comprising at least one conductor. The injection probe further comprises circuitry for injecting the RF signal as a surface electromagnetic wave into said electrical cable.

This object is also obtained by an extraction device for power transfer, comprising an extraction probe configured to wirelessly extract power from a surface electromagnetic wave that propagates along a cable with at least one conductor, and a converter configured for converting the extracted power to an output voltage, relative a ground potential, at an output port of the extraction device.

This object is further obtained by a surface wave system for power transfer, comprising an electrical cable with at least one conductor, and an injection device. The injection device comprises an RF signal generator configured to generate an RF signal with a predetermined frequency, and an injection probe connected to the RF signal generator, wherein the injection probe is coupled to an electrical cable comprising at least one conductor. The injection probe comprises circuitry for injecting an RF signal into said electrical cable, and wherein the surface wave is configured to be extracted by at least one extraction device.

An advantage of the embodiments disclosed herein is that the proximity requirement of the prior art solutions for wireless power transfer is mitigated, alleviated, or eliminated.

Further objects and advantages may be found in the detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
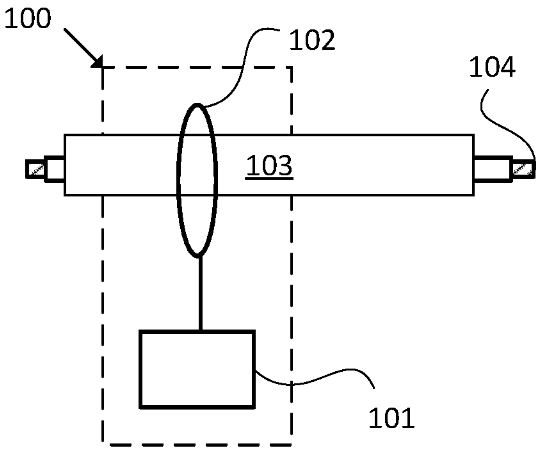
FIG. 1 illustrates a first example of an injection device.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms “a”, “an” and “the” are intended to include the plural forms as well, unless the context clearly indicates otherwise.

Wireless power transfer, WPT, refers to the technology of transferring power without a direct cable connection between a power supply and a device.

Furthermore, in this disclosure the term electrically connected is intended to be interpreted as an ohmic connection such that current may flow through the connection directly.

The term inductive coupling should be interpreted as a coupling between two wires such that a change in current through one wire induces a voltage across the ends of the other wire through electromagnetic induction.

The term capacitive coupling should be interpreted as the transfer of energy within an electrical network or between distant networks by means of a displacement current between circuit(s) nodes, induced by the electric field.

The term common-mode should be interpreted as an analog signal which occurs on at least two wires/conductors with the same phase and amplitude. This signal may co-exist with for example a differential mode signal. A common-mode signal is a signal that appears in phase and with equal amplitudes on each of the lines of a two-wire cable, or multi-wire cable, with respect to the local common or ground in phase and with equal amplitudes. A common-mode voltage is a vector average of the voltages between each conductor of a balanced circuit and the local ground. In a two-wire case any signal transmitted through the wires can be decomposed as the sum of a common mode signal and a differential signal.

Some of the example embodiments presented herein are directed towards an improved power transfer system. As part of the development of the example embodiments presented herein, a problem will first be identified and discussed.

Wireless power transfer, WPT, from a power supply to a device is often performed by means of inductive coupling between the device and the power supply such as for example in Qi charging or NFC technology. Inductive coupling requires that the coil in the power supply and the coil in the device be placed at a distance of a few centimeters, or millimeters, of each other if efficient and low-loss power transfer is to be achieved.

The present inventors have realized that electrical cables may be used as a guided media for an RF signal, guiding the energy flow in a form of a (non-fully formed) surface electromagnetic wave. The theory behind surface electromagnetic waves is well known to the person skilled in the art. Briefly, the surface electromagnetic wave is another solution to Maxwell's equations and is therefore not further discussed in this disclosure. This way an injection device may be used to inject such a surface electromagnetic wave in a cable. At a distance far from the close proximity mentioned in the introductory part of this application an extraction device may be arranged in relation to the electric cable, but without an electrical connection to the conductors of the electric cable in order to extract the injected power from the surface wave that propagates along the electric cable. This way the proximity requirement is mitigated. This also has the advantage that multiple extraction devices may be arranged along the cable.

The use of cables for guiding surface electromagnetic waves opens the possibility to use existing cables in a static or in a moving object, such as a building or a vehicle for WPT.

Another advantage of using the above solution is that the extraction device may be easily moved along the electrical cable without interfering with the insulation of the cable for interconnection. This way a flexible WPT solution is achieved.

FIG. 1 illustrates an example of an injection device, generally designated 100, for WPT. The injection device 100 comprises an RF signal generator 101 configured to generate an RF signal of a predetermined frequency. The injection device further comprises an injection probe 102 connected to the RF signal generator 101, wherein the injection probe 102 is configured to be coupled to an electrical cable 103 comprising at least one conductor 104. The injection probe 102 comprises circuitry for injecting the RF signal as a surface electromagnetic wave into said cable 103.

The electrical cable 103 contains at least one conductor 104 that may be insulated. In some embodiments, the electrical cable 103 contains multiple conductors 204,205,206 and they may be mutually insulated from each other, such as in a conventional AC power cable with three insulated conductors.

Figure 2:
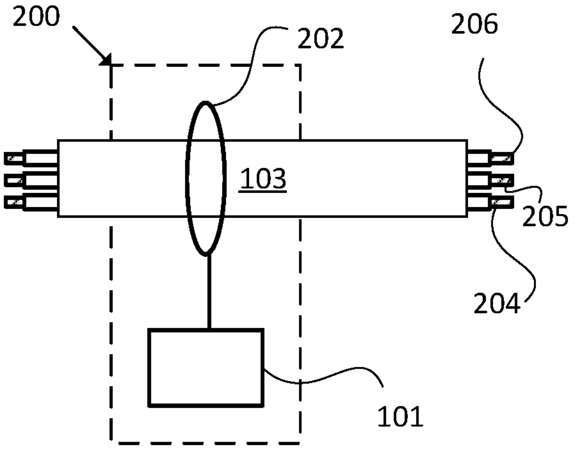
FIG. 2 illustrates a second example of an injection device.

FIG. 2 illustrates an example of an injection device that differs from the injection device disclosed with reference to FIG. 1 in that the injection probe 102 is configured to inject the RF signal from the RF signal generator 101 as a surface electromagnetic wave in a common-mode into said electrical cable 103 comprising at least two conductors 204,205. In some embodiments the electrical cable 103 comprises at least three conductors 204,205,206, such as a grounded power cable with a phase signal, a neutral, and a protection ground. By injecting the RF signal in common-mode a common mode rejection filter, also called a choke in the art, the device electrically connected to said electrical cable for receiving power from it will filter away said injected common-mode signal. The power supply of the connected device will thus not be affected by the injected RF signal. The use of common mode rejection filters is widespread today due to the use of switched mode power supplies which may generate common mode voltages. This provides easy integration into an existing cable harness.

In some embodiments the injection probe 202 is configured to inject the RF signal from the RF signal generator as a surface electromagnetic wave in common-mode into said electrical cable 103 comprising at least three conductors 204,205,206. Such an electrical cable 103 may be a power cable for connection to a mains outlet in a building.

The predetermined frequency of the RF generator 101 in some embodiments is located in the ISM band, 13.56 MHz. In other embodiments, it may be the Qi charging frequency, I.e. 140 kHz. The range of possible frequencies is fairly large. There are some rules for selection of the RF frequency, however. First, it should be sufficiently high so that the RCD (Residue Current Device) for the power supply will not be triggered. Second, it should not be too high such that interference is generated for applications that use the frequency.

Figure 3:
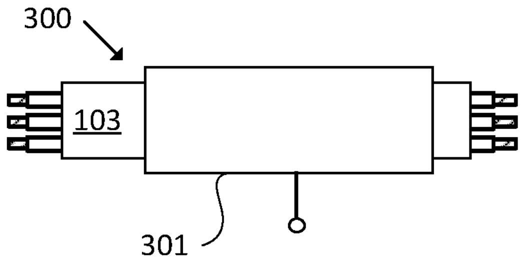
FIG. 3 illustrates a first example of an injection probe.

In FIG. 3 an example of an injection probe, generally designated 300, is disclosed. The injection probe 300 is a capacitive probe. This injection probe 300 comprises an electrically conducting foil 301 wrapped around the cable 103, the foil 301 is electrically isolated from the cable and the foil is electrically connected to the RF generator 101. The foil 301 is an example of a circuitry for injecting the surface electromagnetic wave. The foil is capacitively coupled to the electrical cable and the conductors thereof.

Figure 4:
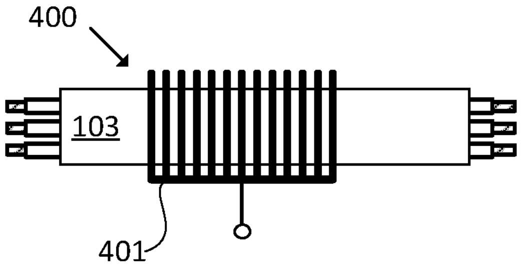
FIG. 4 illustrates a second example of an injection probe.

In FIG. 4 an embodiment of a capacitive probe, generally designated 400, is illustrated. The capacitive probe comprises a wrapping coil 401 configured to be arranged around the cable electrical 103, such that the wrapping coil is capacitively coupled to the cable. The wrapping coil 401 is an example of a circuitry for injecting the surface electromagnetic wave.

So far different embodiments of injection devices and injection probes have been described. In order to extract power from the injected surface electromagnetic wave in the cable 103, a suitable extraction device is needed.

Figure 5:
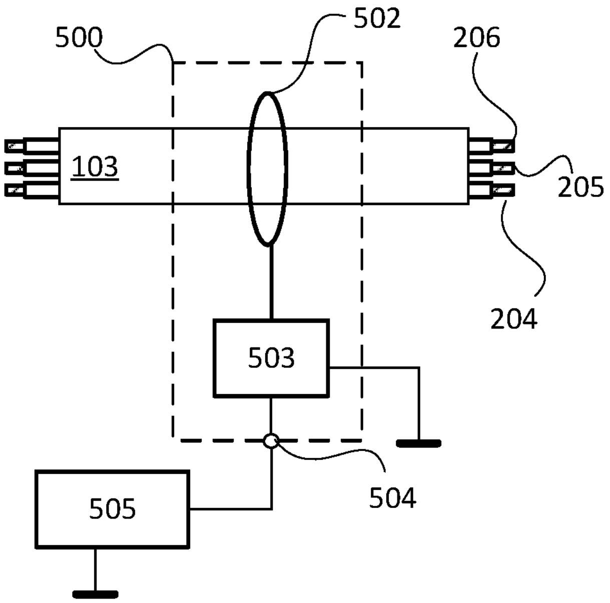
FIG. 5 illustrates an example embodiment of an extraction device.

In FIG. 5 such an extraction device for wireless power transfer, generally designated 500, is disclosed. The extraction device 500 comprises an extraction probe 502 configured to wirelessly extract power from a surface electromagnetic wave that propagates along the electrical cable 103 that comprises at least one conductor, but which in FIG. 5 is illustrated with three conductors 204,205,206. The extraction device 500 further comprises a converter 503 configured for converting the extracted power to an output voltage, relative a ground potential, at an output port 504 of the extraction device 500. The output port 504 is connected to a device 505 for powering thereof.

In some embodiments, the extraction probe 502 is configured to extract power from a common-mode surface electromagnetic wave propagating along said electrical cable 103 comprising at least two conductors 204,206, or at least three conductors 204,205,206.

In some embodiments, the electrical cable 103 comprises at least two conductors 204,206, and the injection probe 202 is configured to inject the RF signal from the RF signal generator 101 as a surface electromagnetic wave in a common-mode into said electrical cable 103 comprising at least two conductors 204,206, or at least three conductors 204, 205,206.

In some embodiments, the extraction probe 502 is an inductive coupler. For example, in FIG. 6 the extraction probe 602 is an air core coil. The air core coil is a rectangular air core coil 601 with a side 603 configured to be parallel with said cable 103. Furthermore, the rectangular air core coil in FIG. 6 is wound in a plane parallel to the cable as a spiral.

An air core coil is a coil that contains no ferrite material in the core. For example, an air core coil is a coil with windings arranged on a non-magnetic material. A rectangular air core coil is a planar coil having rectangular shape with the windings in the same plane and a non-magnetic material in the center of the coil.

Figure 6:
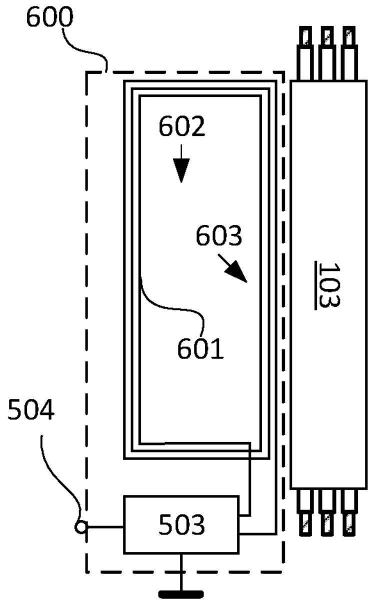
FIG. 6 illustrates a first example of an extraction probe.
Figure 7:
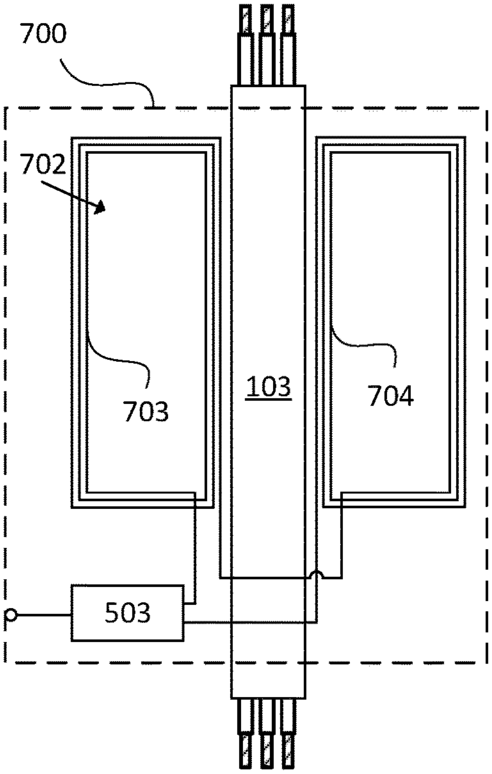
FIG. 7 illustrates a second example of an extraction probe.

FIG. 7 illustrates an embodiment of an extraction device, generally designated 700, which differs from the embodiment disclosed with reference made to FIG. 6 in that the rectangular air core coil 702 comprises a first rectangular coil 703 wound in the clockwise direction. The rectangular air core coil 702 further comprises a second rectangular coil 704 wound in the counterclockwise direction. The first rectangular coil 703 is configured to be arranged on a first side of said electrical cable 103, and wherein said second rectangular coil 704 is configured to be arranged on a second side of the electrical cable 103, and wherein the first side is opposite the second side. This way a sensitive air core coil 702 is achieved. This extraction device may also be used for common-mode extraction as disclosed above.

Figure 8:
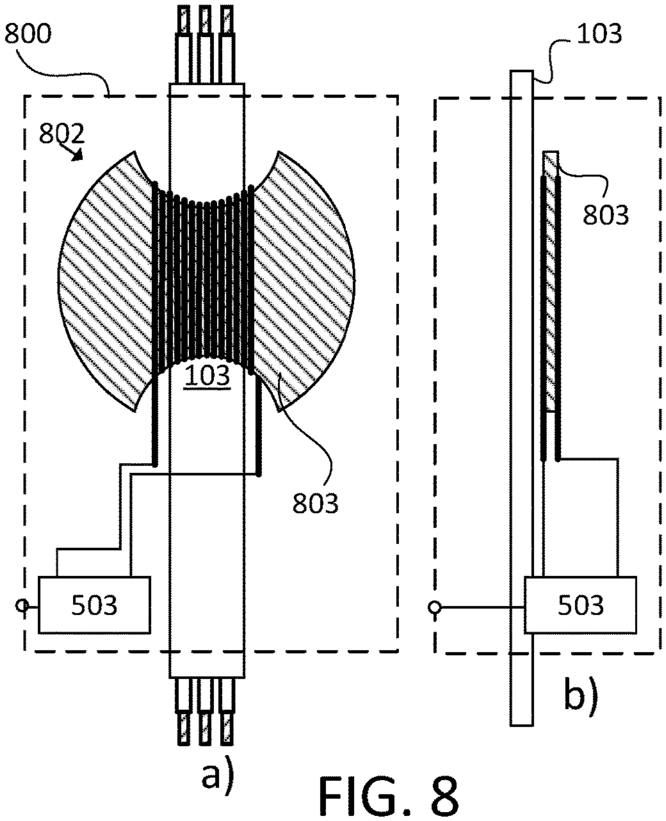
FIG. 8 illustrates a third example of an extraction probe.

FIG. 8*a* illustrates an embodiment of an extraction device, generally designated 800. This embodiment provides the inductive coupler as a coil with a disc shaped ferrite core 803. The ferrite core 803 is arranged symmetrically on the electrical cable 103 with the flat side of the disc arranged in parallel with a direction along the longitudinal direction of the cable 103. The windings on the top and bottom of the disc are parallel with the cable, and this is shown in FIG. 8*b*.

Figure 9:
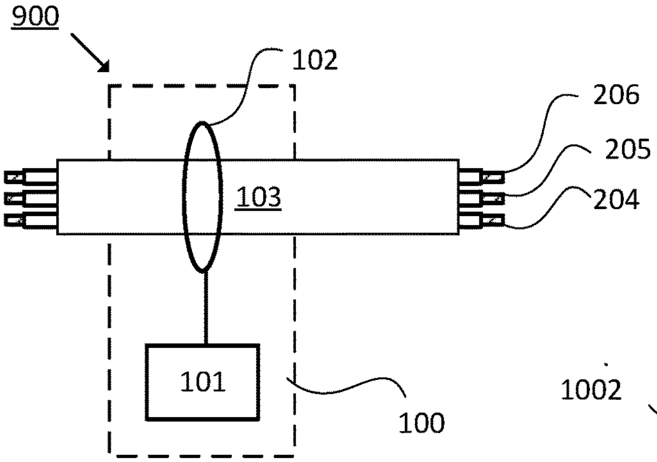
FIG. 9 illustrates an example embodiment of a power transfer system.

In FIG. 9 an embodiment of a surface electromagnetic wave system, generally designated 900, for WPT is illustrated. The surface electromagnetic wave system comprises an electrical cable 103 with at least one conductor 204,205 or 206. The surface wave system further comprises an injection device 100, which comprises an RF signal generator 101 configured to generate an RF signal of a predetermined frequency. The injection device 100 further comprises an injection probe 102 connected to the RF signal generator 101, wherein the injection probe 102;202 is coupled to the electrical cable 103 comprising at least one conductor 204, 205 or 206. The injection probe 102 comprises circuitry for injecting an RF signal into said cable 103, and wherein the surface electromagnetic wave is configured to be extracted by at least one extraction device 500 according to embodiments disclosed herein.

The embodiment of a surface wave system 900 disclosed with reference made to FIG. 9, may in some embodiments have an electrical cable 103 comprising at least two conductors 204,205,206 (thus three conductors in FIG. 9), and the injection probe 202 of the injection device 100 is configured to inject the RF signal from the RF signal generator 101 as a surface electromagnetic wave in a common-mode into said cable 103 comprising at least two conductors 204,205,206. This way the surface wave is injected into the conductors of the cable in a common mode and this is beneficial since a choke, or a common mode rejection filter of a device electrical connected to the conductors of the cable will filter away this signal before entering the power supply of the device. Therefore, connected devices will not be affected by the surface magnetic waves injected into the electrical cable.

In some embodiments of the surface wave system 900, the cable 103 comprises at least three conductors 204,205,206, and the injection probe 202 is configured to inject the RF signal from the RF signal generator 101 as a surface wave in a common-mode into the electrical cable 103 comprising at least three conductors 204,205,206. Such an electrical cable is a commonly used cable in wiring of houses and buildings for powering of household equipment.

Figure 10:
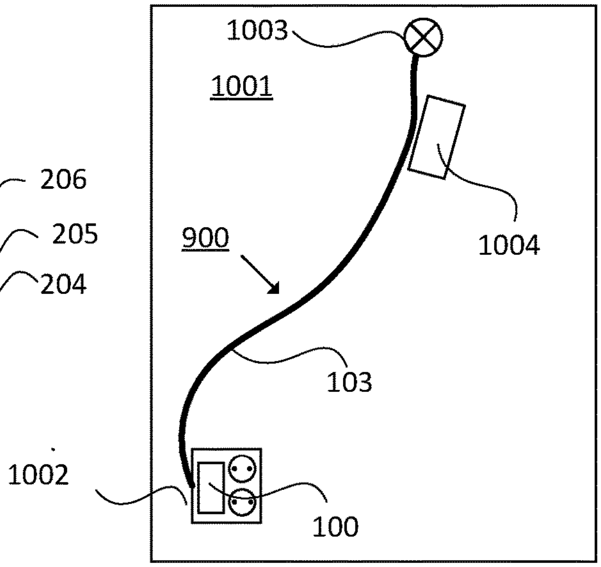
FIG. 10 illustrates an example embodiment of a power transfer system integrated in a wall of a building.

In some embodiments of the surface wave system 900, the electrical cable 103 is a power cable and the injection device 100 is arranged in a power outlet 1002. Such a system is disclosed in FIG. 10 which shows a surface electromagnetic wave system 900, wherein the power cable 103 is configured to be permanently installed in a wall of a building 1001 for supplying a lamp 1003 with electricity. A fire alarm 1004 is arranged at a position along the cable and comprises an extraction device according to earlier embodiments and is powered by means of said extraction device. The power outlet is a wall mounted power outlet 1002 in the building 1001. This way the injection device may be integrated in the wall without any major changes to the installation and a flexible installation of the fire alarm is achieved.

The disclosure relates to an injection device for wireless power transfer, comprising an RF signal generator configured to generate an RF signal with a predetermined frequency and an injection probe connected to the RF signal generator, wherein the injection probe is configured to be coupled to an electrical cable comprising at least one conductor, and wherein the injection probe comprises circuitry for injecting the RF signal as a surface electromagnetic wave into said electrical cable.

According to some embodiments, the injection probe is configured to inject the RF signal from the RF signal generator as a surface electromagnetic wave in a common-mode into said electrical cable comprising at least two conductors.

According to some embodiments, the injection probe is configured to inject the RF signal from the RF signal generator as a surface electromagnetic wave in a common-mode into said electrical cable comprising at least three conductors.

According to some embodiments, the injection probe is a capacitive probe.

According to some embodiments, the capacitive probe is a wrapping coil, or foil, configured to be arranged around said cable.

According to some embodiments, the predetermined frequency is the ISM band, 13.56 MHZ, or the Qi charging frequency, 140 kHz.

The disclosure also relates to an extraction device for wireless power transfer, comprising an extraction probe configured to wirelessly extract power from a surface electromagnetic wave that propagates along an electrical cable with at least one conductor, and a converter configured for converting the extracted power to an output voltage, relative a ground potential, at an output port of the extraction device.

According to some embodiments, the extraction probe is configured to extract power from a common-mode surface electromagnetic wave propagating along said electrical cable comprising at least two conductors.

According to some embodiments, the extraction probe is configured to extract power from a common-mode surface electromagnetic wave propagating along said cable comprising at least three conductors.

According to some embodiments, the extraction probe is an inductive coupler.

According to some embodiments, the inductive coupler is an air core coil.

According to some embodiments, the air core coil is a rectangular air core coil with a side configured to be parallel with said electrical cable.

According to some embodiments, the rectangular air core coil comprises a first rectangular coil wound in a clockwise direction, and a second rectangular coil wound in a counterclockwise direction, wherein said first rectangular coil is configured to be arranged on a first side of said cable, and wherein said second rectangular coil is configured to be arranged on a second side of the cable, and wherein the first side is opposite the second side.

According to some embodiments, the inductive coupler is a coil with a disc shaped ferrite core.

The disclosure also relates to a surface wave system for wireless power transfer, comprising a cable with at least one conductor, and an injection device, comprising: a RF signal generator configured to generate a RF signal with a predetermined frequency, an injection probe connected to the RF signal generator, wherein the injection probe is coupled to a cable comprising at least one conductor, wherein the injection probe comprises circuitry for injecting a RF signal into said cable, and wherein the surface wave is configured to be extracted by at least one extraction device.

According to some embodiments, the electrical cable comprises at least two conductors, and the injection probe is configured to inject the RF signal from the RF signal generator as a surface wave in a common-mode into said electrical cable comprising at least two conductors.

According to some embodiments, the cable comprises at least three conductors, and the injection probe is configured to inject the RF signal from the RF signal generator as a surface electromagnetic wave in a common-mode into said cable comprising at least three conductors.

According to some embodiments, the electrical cable is a power cable and the injection device is arranged in a power outlet.

According to some embodiments, the power cable is configured to be permanently installed in a wall of a building and the power outlet is a wall mounted power outlet in said building.

In the drawings and specification, exemplary embodiments have been disclosed. However, many variations and modifications can be made to these embodiments. Accordingly, although specific terms are employed, they are used in a generic and descriptive sense only and not for purposes of limitation, the scope of the embodiments being defined by the following claims.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products.

It should be appreciated that the example embodiments presented herein may be practiced in any combination with each other. It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless communication device" as the term may be used herein, is to be broadly interpreted to include a radiotelephone having ability for Internet/intranet access. However, not only wireless communication devices can be powered using the WPT described in this application, but also any electric or electronic device having a built-in electric circuit which can be powered by inductive or capacitive coupling between an electrical cable carrying an RF signal produced by the device without being in close proximity to the electrical cable described earlier. Examples of other electric or electronic devices may be a digital camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving electric signals, such as a personal computer, a home entertainment system, a television, etc. Furthermore, a device may be interpreted as any number of antennas or antenna elements.

In the drawings and specification, there have been disclosed exemplary embodiments. However, many variations and modifications can be made to these embodiments.

Accordingly, although specific terms are employed, they are used in a generic and descriptive sense only and not for purposes of limitation, the scope of the embodiments being defined by the following claims.

The invention claimed is:

1. An injection device for wireless power transfer, comprising:

a Radio Frequency (RF) signal generator configured to generate an RF signal of a predetermined frequency;

an injection probe connected to the RF signal generator, wherein the injection probe is configured to be coupled to an electrical cable comprising at least two conductors, and wherein the injection probe is a capacitive probe that comprises wrapping coil or foil;

wherein the injection probe comprises circuitry for injecting, via the wrapping coil or foil that is arranged around the electrical cable, the RF signal as a surface electromagnetic wave into said cable, wherein the electrical cable comprises at least two conductors that are individually insulated, and the injection probe injects the RF signal from the RF signal generator as surface electromagnetic waves in a common-mode into the at least two conductors.

2. The injection device according to claim 1, wherein the electrical cable comprises at least three conductors, and the injection probe injects the RF signal from the RF signal generator as surface electromagnetics wave in a common-mode into the at least three conductors.

3. The injection device according to claim 1, wherein the predetermined frequency is the ISM band, 13.56 MHz, or the Qi charging frequency, 140 kHz.

* * * * *